(No Model.) 15 Sheets—Sheet 1.
J. J. SULLIVAN.
MACHINE FOR WRAPPING, PRINTING, AND BOXING CAKES OF YEAST, CARAMELS, &c.
No. 595,866. Patented Dec. 21, 1897.
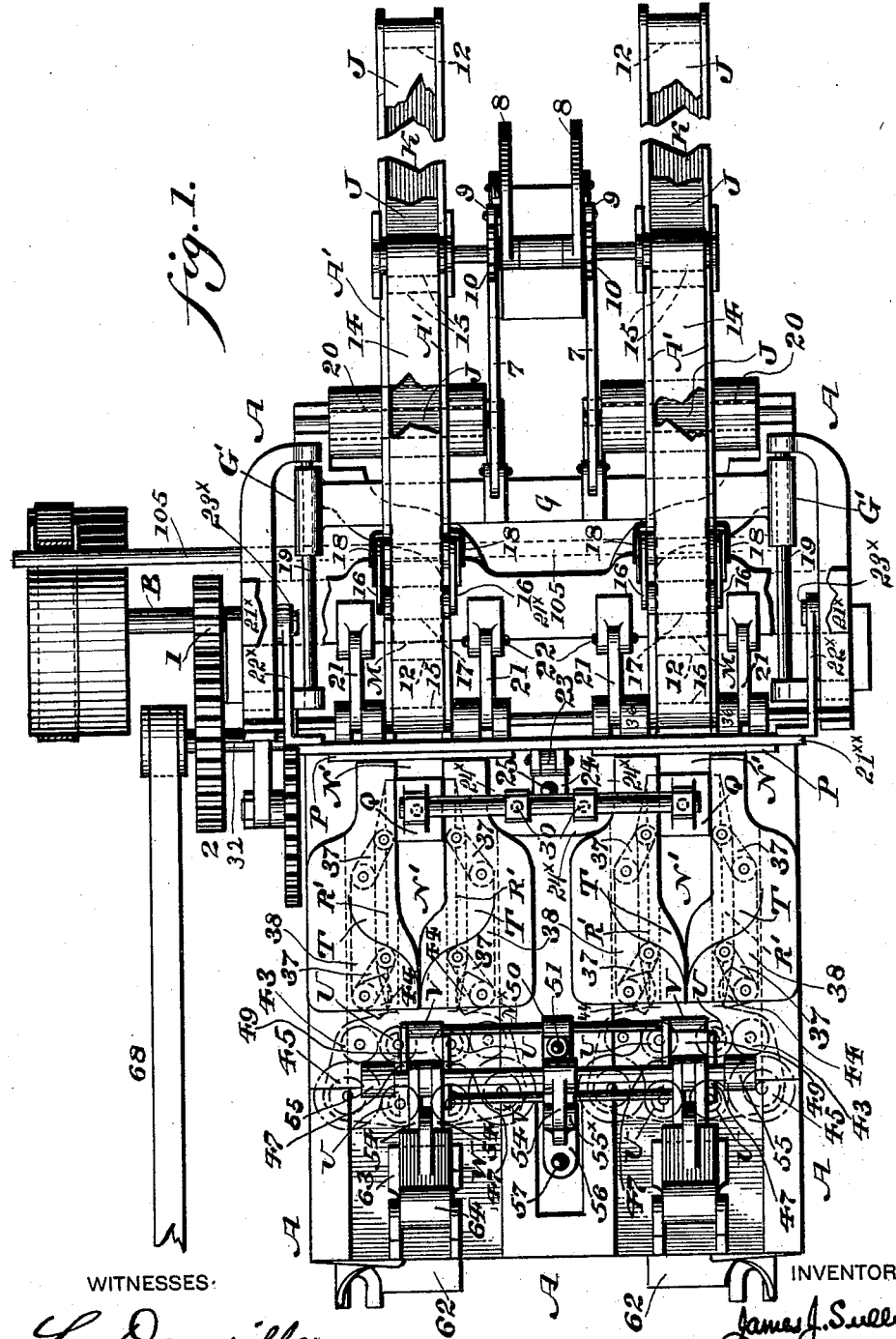
WITNESSES
L. Douville,
P. H. Aragle.
INVENTOR
James J. Sullivan
BY John A. Wiedersheim
ATTORNEY.

(No Model.) 15 Sheets—Sheet 2.
J. J. SULLIVAN.
MACHINE FOR WRAPPING, PRINTING, AND BOXING CAKES OF YEAST, CARAMELS, &c.
No. 595,866. Patented Dec. 21, 1897.
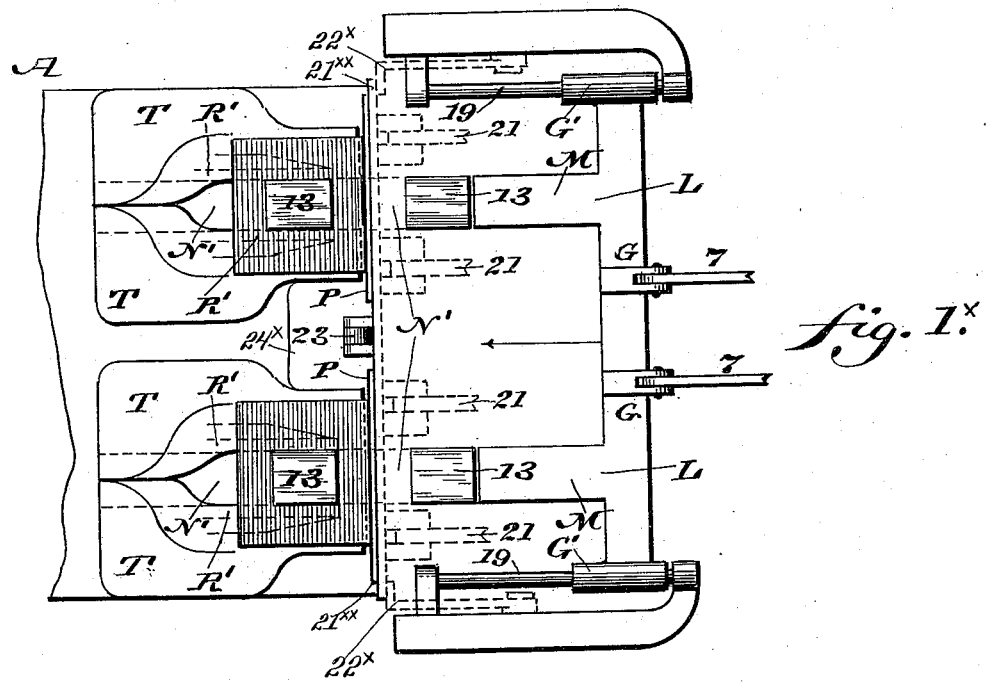

(No Model.)

15 Sheets—Sheet 3.

J. J. SULLIVAN.
MACHINE FOR WRAPPING, PRINTING, AND BOXING CAKES OF YEAST, CARAMELS, &c.

No. 595,866.

Patented Dec. 21, 1897.

fig. 1.ˣˣ

WITNESSES
L. Douville,
A. F. Nagle.

INVENTOR.
James J. Sullivan
BY John A. Wedersheim
ATTORNEY

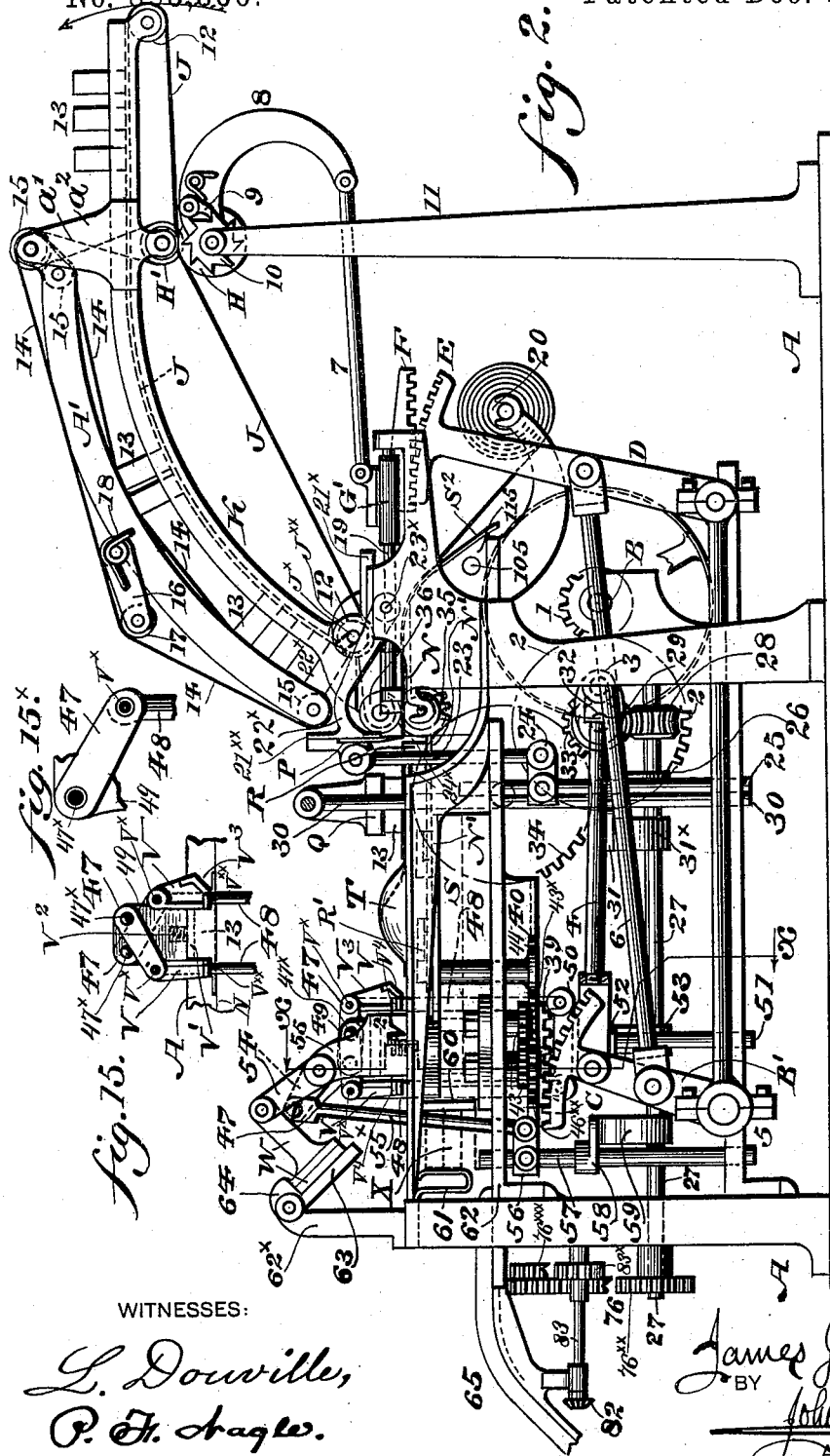

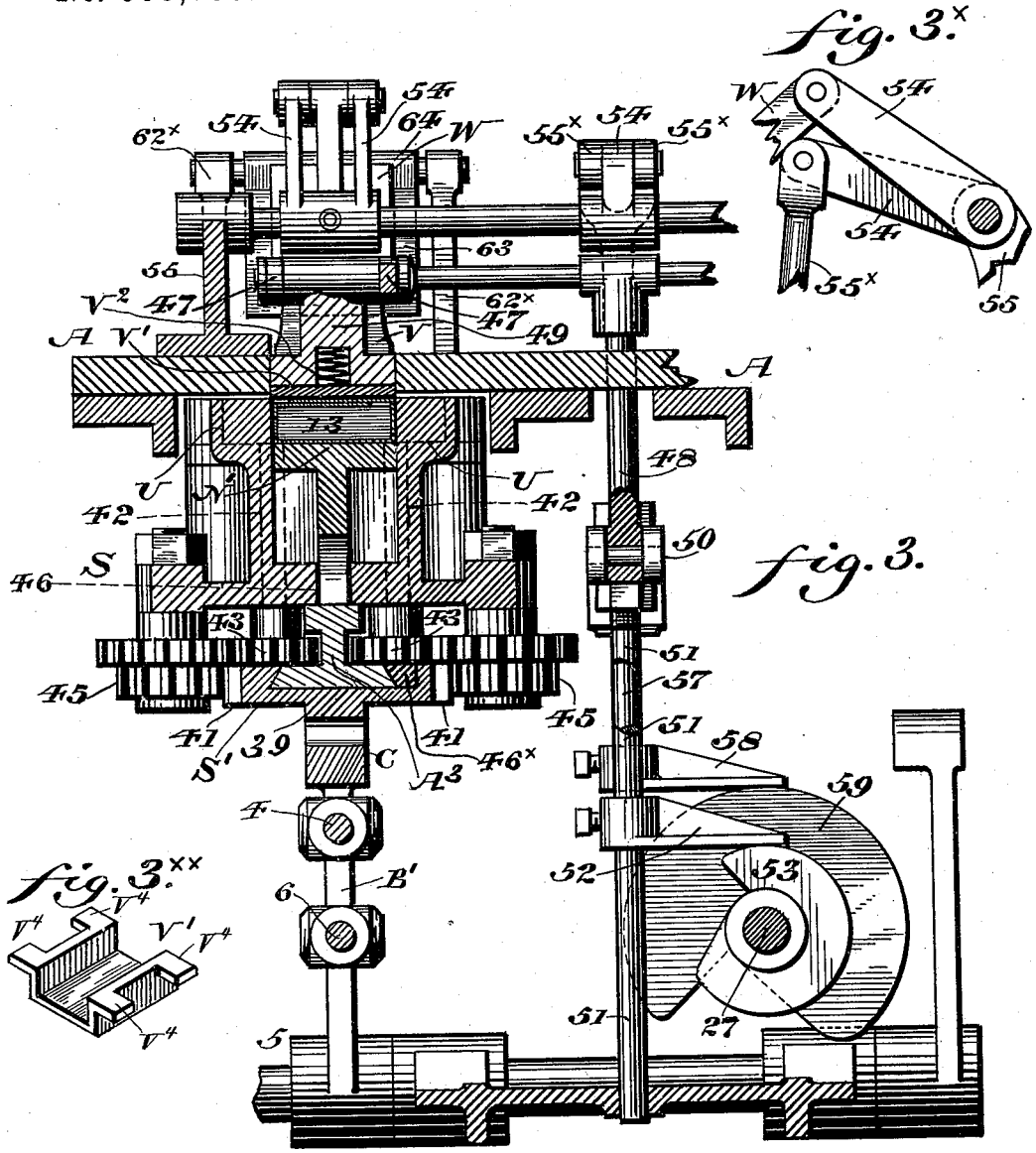

(No Model.) 15 Sheets—Sheet 6.
J. J. SULLIVAN.
MACHINE FOR WRAPPING, PRINTING, AND BOXING CAKES OF YEAST, CARAMELS, &c.
No. 595,866. Patented Dec. 21, 1897.
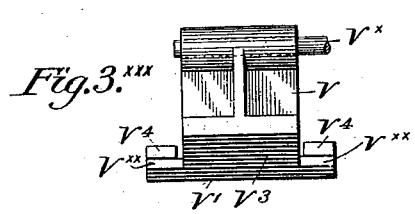
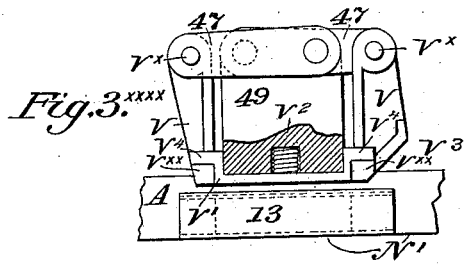
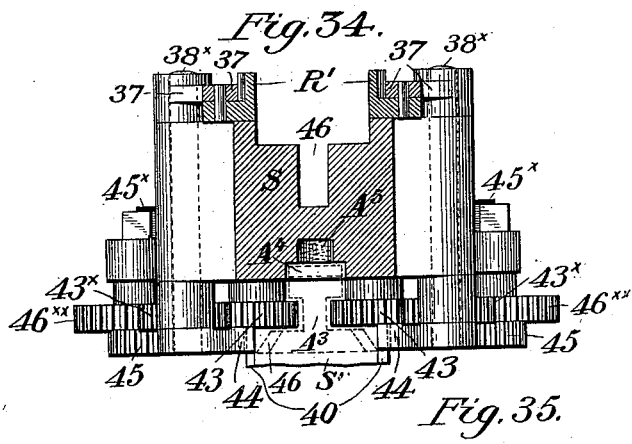
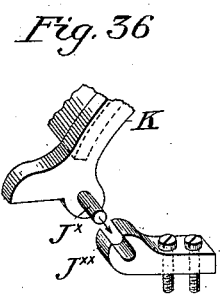
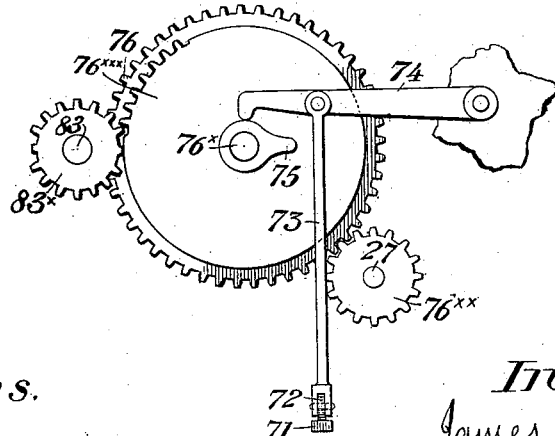
Witnesses.
L. Douville,
P. F. Aagle.
Inventor.
James J. Sullivan.
By Johna Niedersheim.
Attorney.

(No Model.) 15 Sheets—Sheet 7.
J. J. SULLIVAN.
MACHINE FOR WRAPPING, PRINTING, AND BOXING CAKES OF YEAST, CARAMELS, &c.
No. 595,866. Patented Dec. 21, 1897.
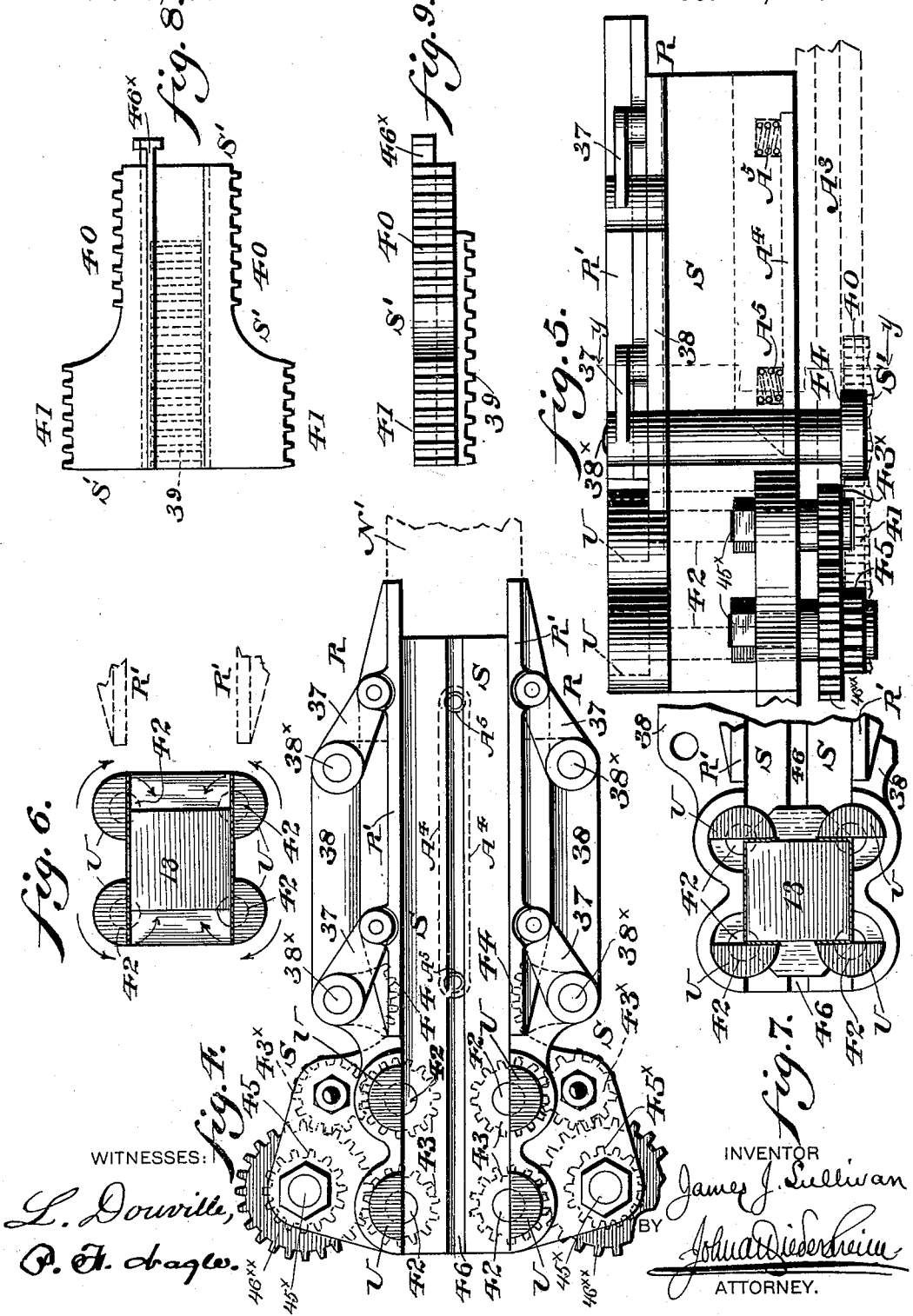

(No Model.) 15 Sheets—Sheet 8.
J. J. SULLIVAN.
MACHINE FOR WRAPPING, PRINTING, AND BOXING CAKES OF YEAST, CARAMELS, &c.
No. 595,866. Patented Dec. 21, 1897.
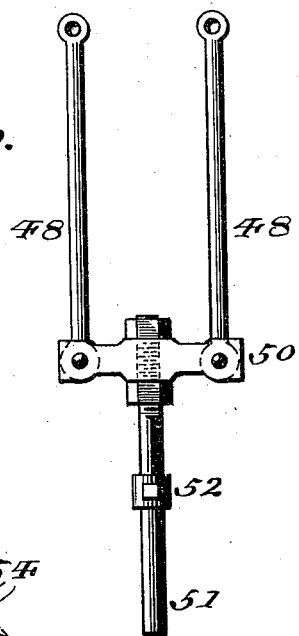
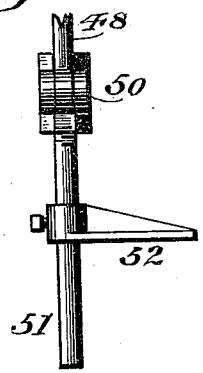
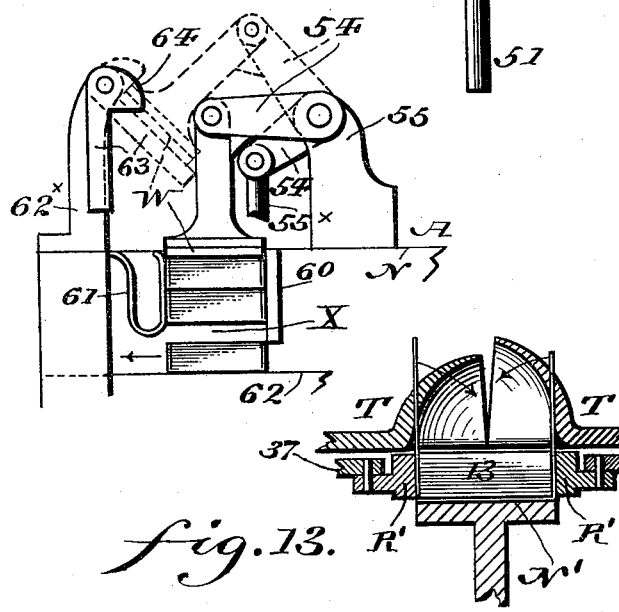
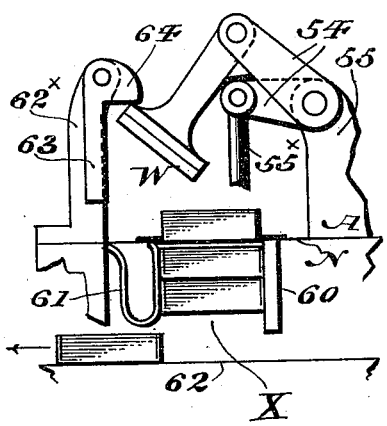
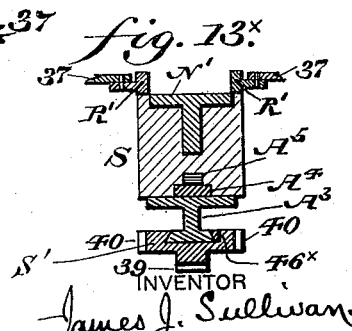
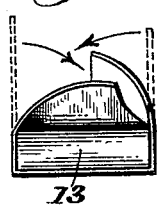
WITNESSES:
L. Douville,
P. H. Aagle.
INVENTOR
James J. Sullivan.
BY
John A. Wiedersheim
ATTORNEY.

(No Model.) 15 Sheets—Sheet 9.
J. J. SULLIVAN.
MACHINE FOR WRAPPING, PRINTING, AND BOXING CAKES OF YEAST, CARAMELS, &c.
No. 595,866. Patented Dec. 21, 1897.
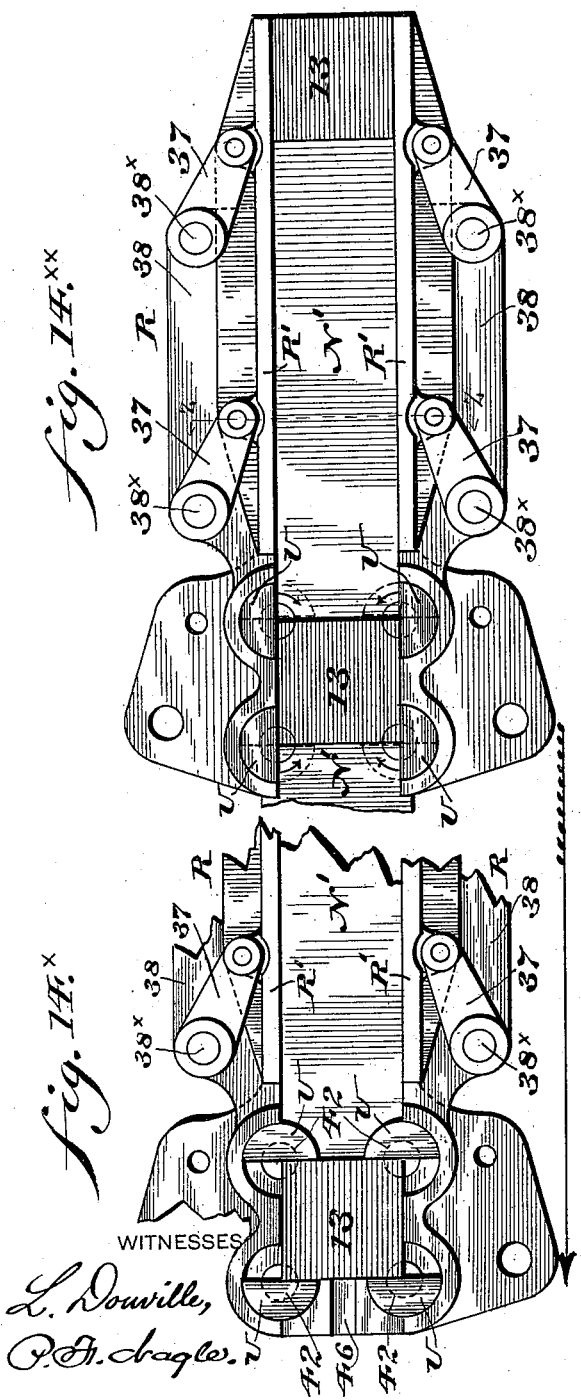
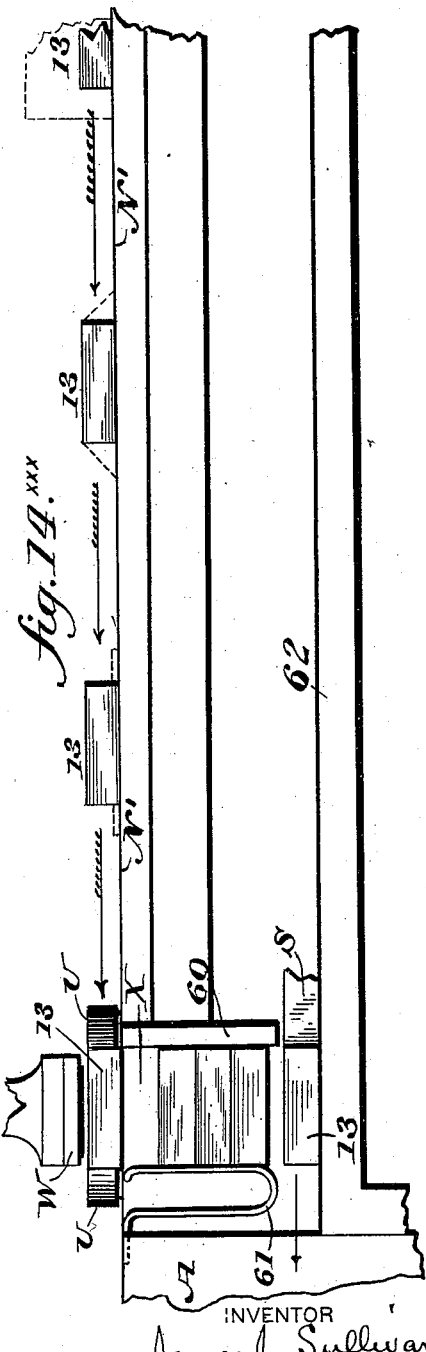

(No Model.) 15 Sheets—Sheet 10.
J. J. SULLIVAN.
MACHINE FOR WRAPPING, PRINTING, AND BOXING CAKES OF YEAST,
CARAMELS, &c.
No. 595,866. Patented Dec. 21, 1897.
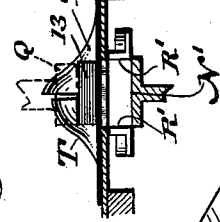
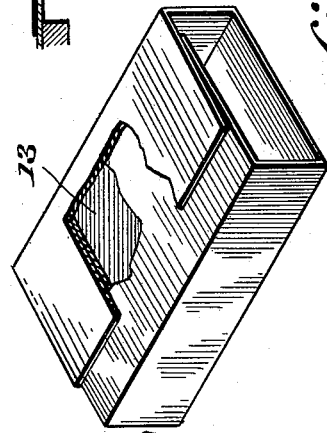
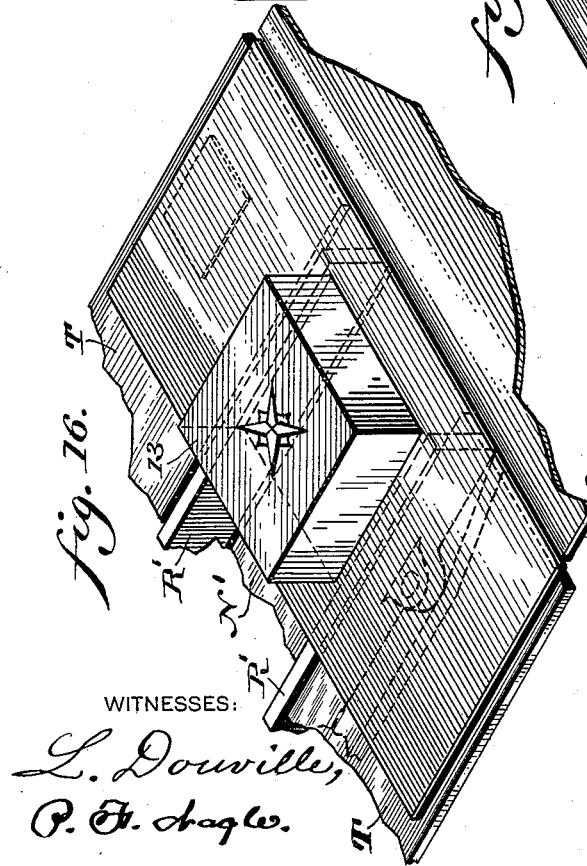
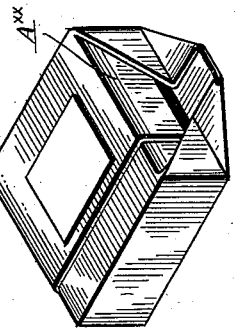
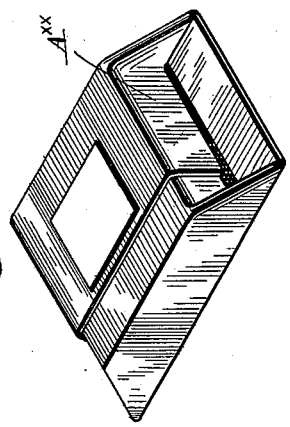
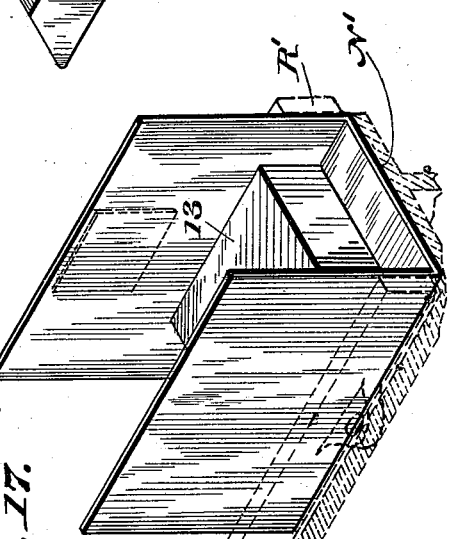
WITNESSES:
L. Douville,
P. H. Aagles.
INVENTOR
James J. Sullivan.
BY
John R. Wiedersheim
ATTORNEY.

(No Model.) 15 Sheets—Sheet 11.
J. J. SULLIVAN.
MACHINE FOR WRAPPING, PRINTING, AND BOXING CAKES OF YEAST, CARAMELS, &c.
No. 595,866. Patented Dec. 21, 1897.
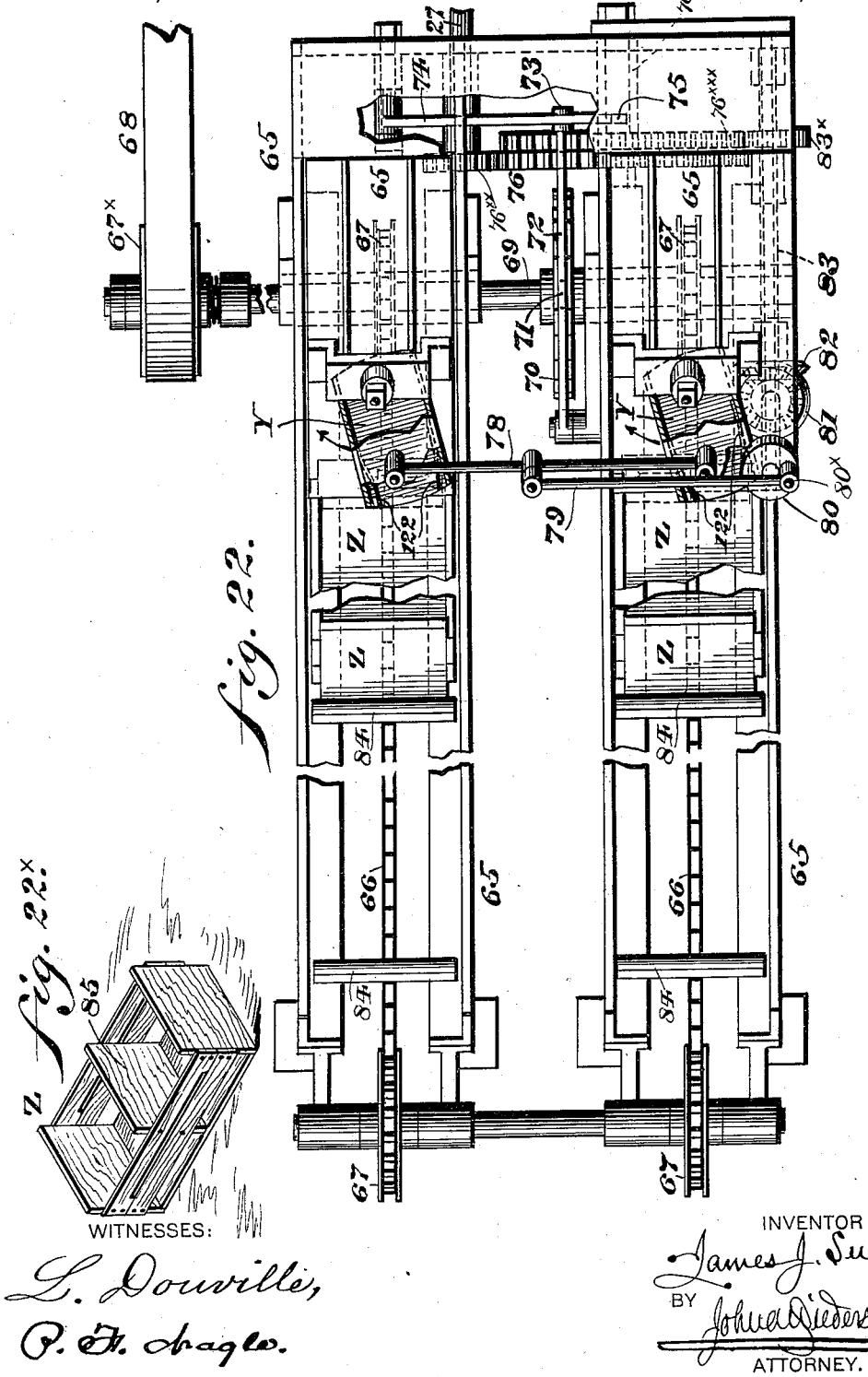

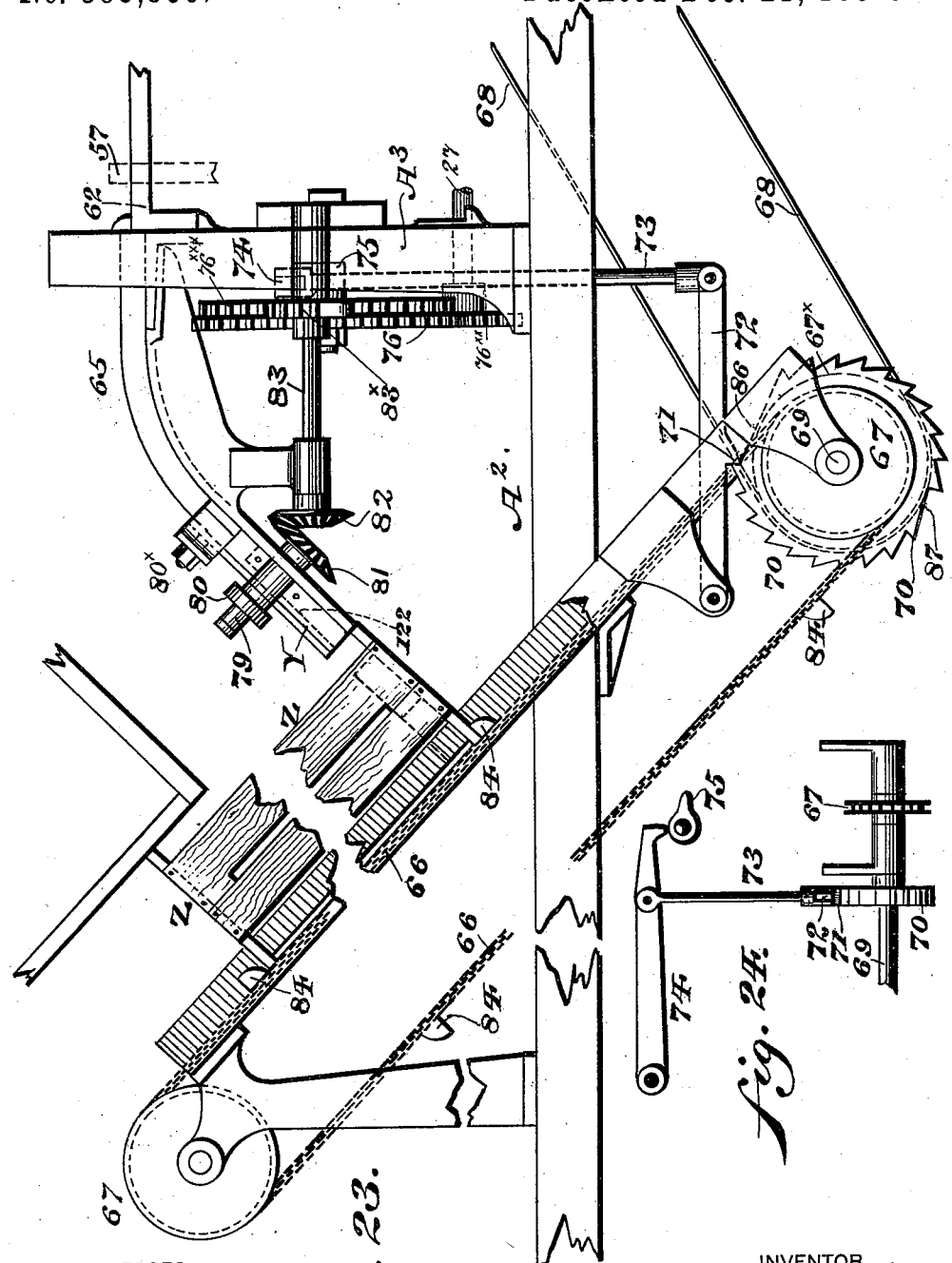

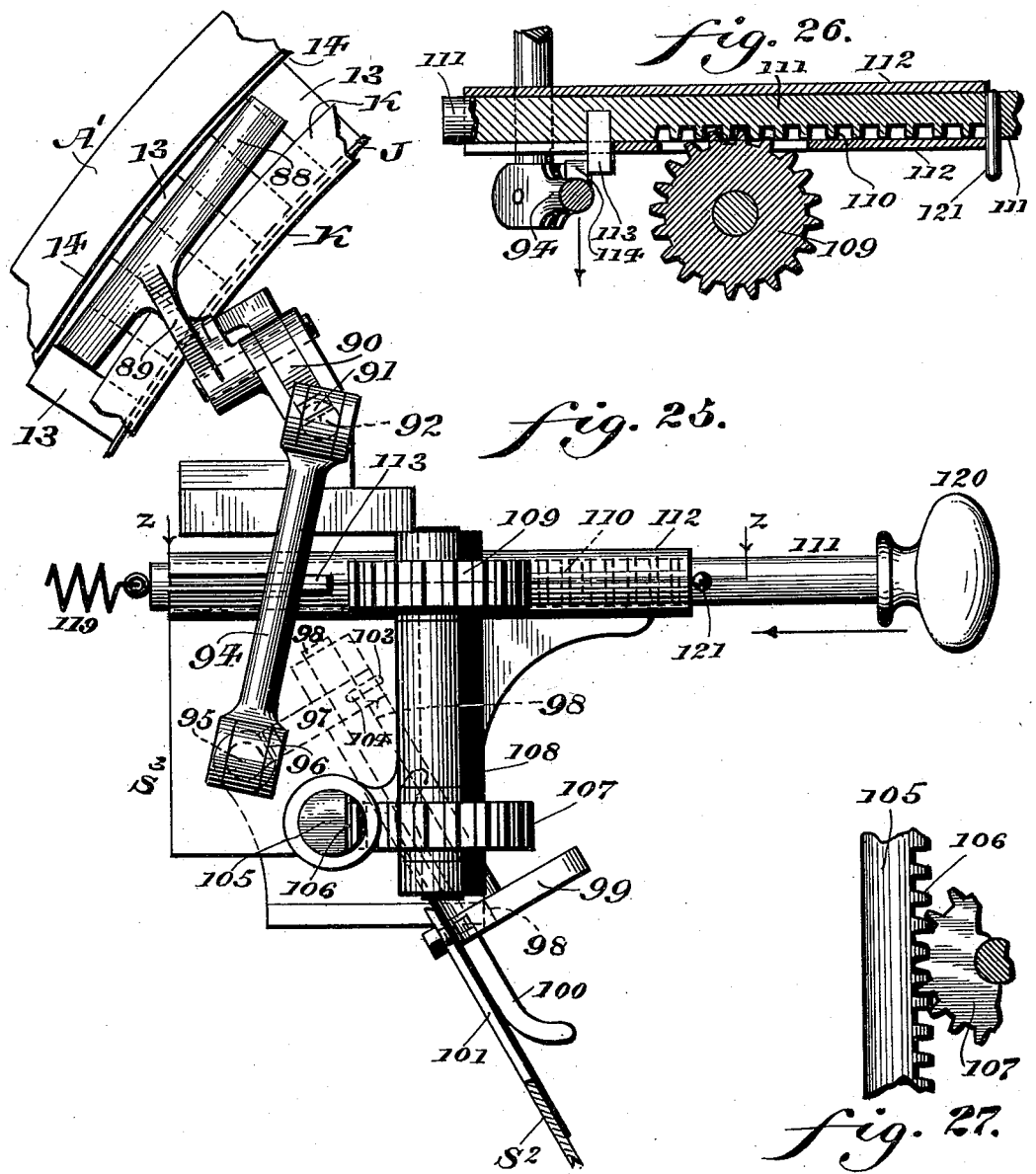

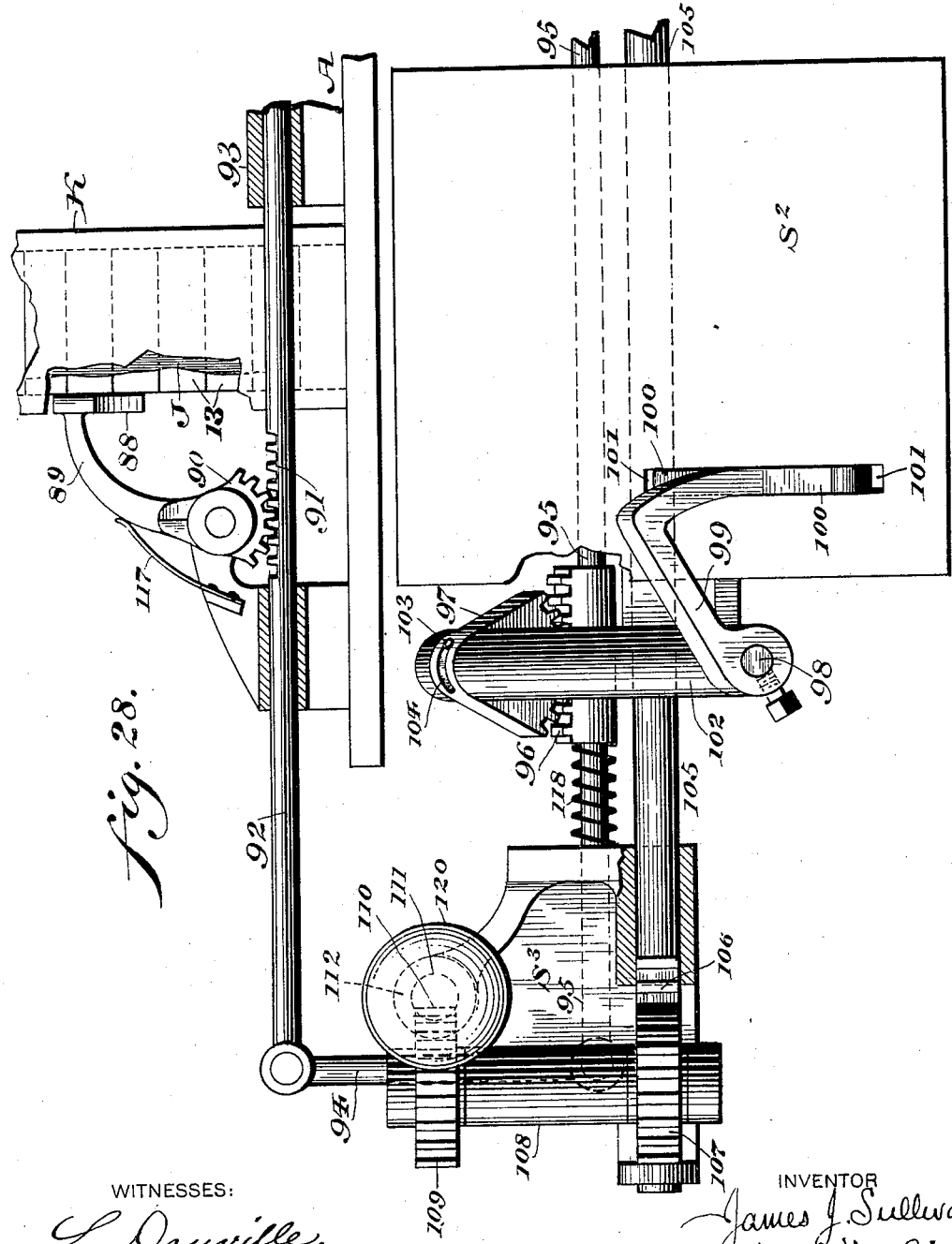

(No Model.) 15 Sheets—Sheet 15.
J. J. SULLIVAN.
MACHINE FOR WRAPPING, PRINTING, AND BOXING CAKES OF YEAST, CARAMELS, &c.
No. 595,866. Patented Dec. 21, 1897.
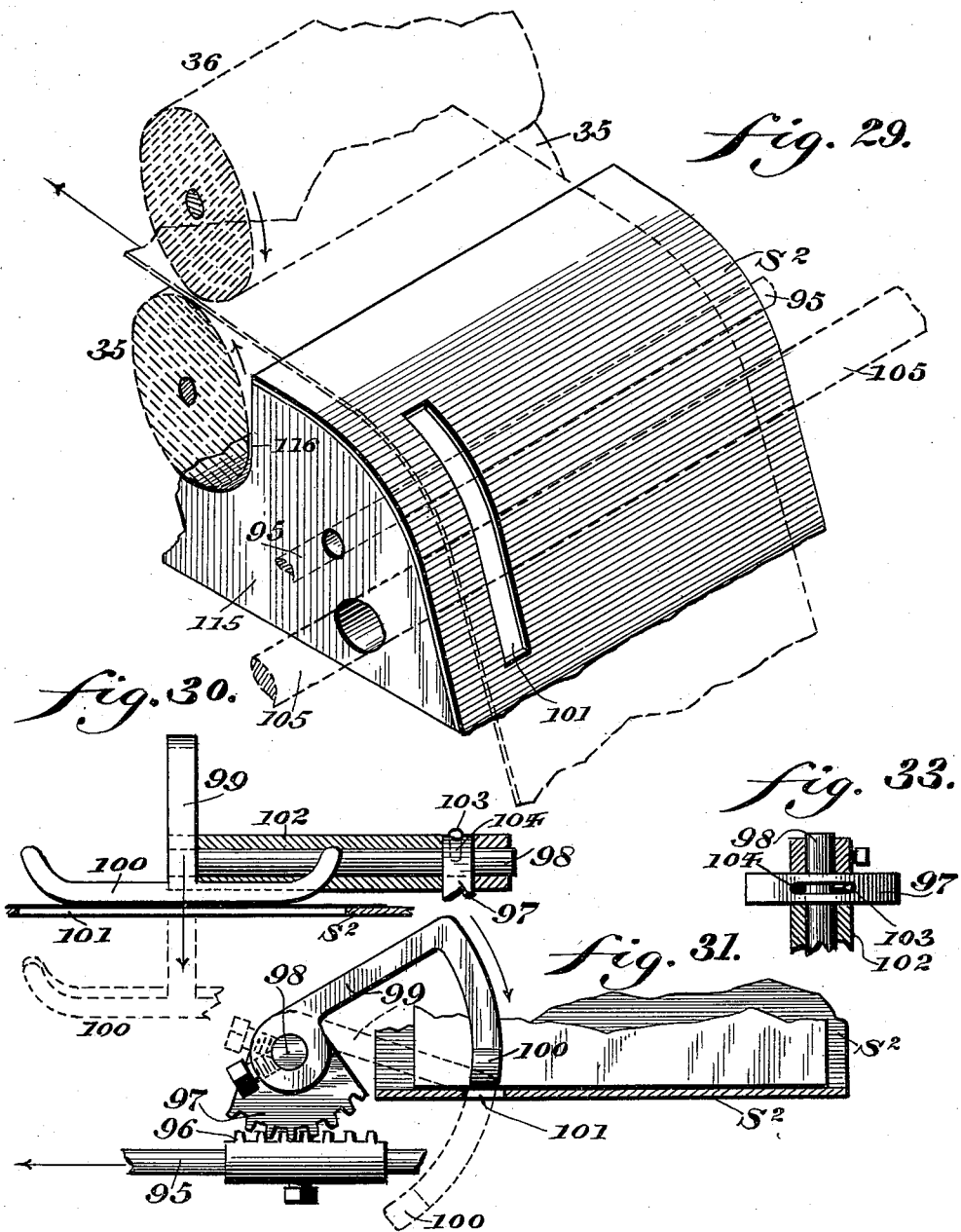

UNITED STATES PATENT OFFICE.

JAMES J. SULLIVAN, OF BROOKLYN, NEW YORK, ASSIGNOR OF ONE-HALF TO BENJAMIN BLEIER, OF NEW YORK, N. Y.

MACHINE FOR WRAPPING, PRINTING, AND BOXING CAKES OF YEAST, CARAMELS, &c.

SPECIFICATION forming part of Letters Patent No. 595,866, dated December 21, 1897.

Application filed March 30, 1896. Serial No. 585,510. (No model.)

*To all whom it may concern:*

Be it known that I, JAMES J. SULLIVAN, a citizen of the United States, residing at Brooklyn, in the county of Kings, State of New York, have invented a new and useful Improvement in Machines for Wrapping, Printing, and Boxing Cakes of Yeast, Caramels, &c., which improvement is fully set forth in the following specification and accompanying drawings.

My invention consists of a machine for wrapping, printing, and boxing cakes of yeast, caramels, &c., embodying, first, mechanism for feeding the cakes, &c., successively and intermittently to a place where they meet tin-foil or other wrapping material which is similarly fed; next, of mechanism for cutting the foil and preventing the sticking of the latter on the knife; next, of mechanism for impressing a trade-mark or other distinguishing characteristic on the cakes, &c.; next, of mechanism for successively folding the wrapper at top, ends, and bottom; next, of means for printing desired matter on the wrapper; next, of novel means for packing or boxing the cakes side by side; next, of means for feeding the boxes to the delivery-chutes relatively to the distance occasioned by partitions in said boxes and the thickness of the ends of adjacent boxes; next, of a novel mechanism for stopping the machine in the event of the cessation of the supply of cakes to the machine or in the event of the foil or wrapping material ending or breaking, and, finally, of details of construction, as will be set forth.

Figure 1, Sheet 1, represents a top or plan view of a portion of a machine embodying my invention. Fig. $1^\times$ represents a plan view of certain detached parts of the machine on an enlarged scale. Fig. $1^{\times\times}$ represents a side elevation of the cutting device and adjacent portions. Fig. 2 represents a side elevation of the portion of the machine shown in Fig. 1. Figs. $2^\times$ and $2^{\times\times}$ represent side views of detached parts and their operating-cams. Fig. 3 represents an irregular vertical section of one side of the machine on line $x\,x$, Fig. 2, on an enlarged scale. Fig. $3^\times$ represents a side elevation of portion of the operating mechanism of the printing-head of the apparatus. Fig. $3^{\times\times}$ represents a perspective view of the presser-foot. Fig. $3^{\times\times\times}$ represents a side elevation of one of the end-folders. Fig. $3^{\times\times\times\times}$ represents a partial side elevation and partial vertical section of the end-folders and adjacent parts at a right angle to Fig. $3^{\times\times\times}$. Fig. 4 represents a top or plan view of the grippers and the side-folders of the apparatus together with the block which carries said parts. Fig. 5 represents a side elevation of the members shown in Fig. 4. Fig. 6 represents a plan view of the folders shown in Fig. 4. Fig. 7 represents a plan view of said folders and the adjacent parts, the folders being in a different position from that shown in Fig. 6. Fig. 8 represents a plan view of the slide of the machine. Fig. 9 represents a side elevation thereof. Fig. 10 represents a side elevation of portion of the operating mechanism of the upper folders. Fig. $10^\times$ represents a side view of portion of Fig. 10. Figs. 11 and 12 represent side elevations of the printing and final folding mechanisms. Fig. 13 represents a transverse vertical section of the primary folding devices. Fig. $13^\times$ represents an irregular vertical section of a portion on line $y\,y$, Fig. 5, and line $z\,z$, Fig. $14^{\times\times}$, on a reduced scale. Fig. 14 represents the operation of said folding devices. Figs. $14^\times$ and $14^{\times\times}$ represent top views of the grippers and folding mechanisms, including part of a stationary plate on which the material to be folded is supported and advanced. Fig. $14^{\times\times\times}$ represents a side view of the table referred to in Figs. $14^\times$ and $14^{\times\times}$, together with part of the printing and final folding mechanisms. Fig. 15 represents a side elevation of the upper folders and connected parts. Fig. $15^\times$ represents a side elevation of some of the members of Fig. 15 on an enlarged scale. Figs. 16 to 21, inclusive, represent the various steps of wrapping accomplished by the machine embodying my invention, some of the members thereof being shown in Fig. 16. Fig. $21^\times$ represents an end view, on a reduced scale, of the primary folding devices, the grippers, and the supporting-table, together with a cake and a piece of wrapping material therefor. Fig. 22 represents a top or plan view of the boxing mechanism. Fig. $22^\times$ represents a perspective view of a form of box employed to receive the cakes or material after being wrapped. Fig. 23 represents a side elevation of the boxing mechanism. Fig. 24 represents a side elevation of a portion at a right angle to that shown in Fig. 23. Fig. 25 represents a side elevation of the stop mechanism employed in connection with the feed-chute. Fig. 26 represents a section of a portion on line $z$ $z$, Fig. 25. Fig. 27 represents a side elevation of a portion at a right angle to that shown in Fig. 25. Fig. 28 represents a front view of the stopping mechanism shown in Fig. 25, including that employed in connection with the wrapping mechanism. Fig. 29 represents a perspective view of the bed employed in connection with the stopping mechanism for the wrapping material. Figs. 30, 31, 32, and 33 represent sections of different portions of said mechanism. Figs. 34, 35, and 36 represent views of detached portions, a portion of Fig. 34 being sectional on lines $z$ $z$, Fig. $14^{\times\times}$.

Similar letters and numerals of reference indicate corresponding parts in the figures.

Referring to the drawings, A designates the frame of the machine, and B designates the driving-shaft of the same, mounted on said frame, said shaft carrying the pinion 1, which meshes with the gear-wheel 2, the latter being mounted on the shaft 32 on the frame A, said shaft carrying also the wrist-pin 3, to which is connected the rod 4, which is pivotally attached to the swinging arm B', whose lower end is mounted, as at 5, on the frame A and whose upper end carries the segmental rack C.

D designates a swinging arm which is mounted at its lower end on the frame A and carries at its upper end the segmental rack E, motion being imparted to said arm D by means of the rod 6, which is connected with said arm D and with the swinging arm B'. (See Fig. 2.)

F designates a rack-bar which meshes with the segmental rack E and is connected with the cross-bar G, to which is pivotally attached the rod 7, (see Figs. 1, 2, and $1^\times$,) said rod being pivotally connected with the oscillating arm 8, on which is mounted the pawl 9, the latter engaging with the ratchet 10, whose shaft carries the feed-roller H, which is mounted on the standard 11 of the frame A, it being evident that when motion is communicated to the bar G the arm 8 will be reciprocated, and thus intermittent motions imparted to the feed-roller H. Mounted above said feed-roller H is a feed-roller H', between which rollers passes the endless apron J, which is guided on the rollers 12, whose bearings are on the ends of a downwardly-curved table or chute K, said table being properly supported on the frame A and having the apron J, adapted to pass over the same, by which provision the articles 13 to be wrapped will be properly supplied to the machine preparatory to the wrapping operation. In order to hold said articles in proper position, I employ the endless apron 14, which is guided on the rollers 15, which are supported upon the arm A' above the chute K, said arm being mounted on the bracket $a^2$, attached to the chute K and carrying the feed-roller H', it being noticed that as the articles pass under said apron 14 they are engaged by the same and held sufficiently tight on the apron J, as will be apparent on inspection of Fig. 2. Motion is imparted to the apron 14 by means of the band or belt $a'$, which passes around the feed-roller H' and one of the rollers 15. In order to adjust the tension of said apron 14, I employ the crank or swinging arm 16, which is mounted on the arm A' of the frame and carries the roller 17, which bears against the upper portion of the apron 14, said arm being adapted to be pressed outwardly by means of the coil-spring 18, which is mounted on the axis of said arm 16 and has its ends connected with said arms A' and 16, the effect of which is evident. The chute J and its connected parts may be raised, as may also be the arm A', for inspection of the parts thereof or other purpose requiring the same, the shaft of the upper roller 15 being the axis of the arm A' and that of the roller H' being the axis of the chute K, it being noticed that said chute has projecting from its sides the studs $J^\times$, which are adapted to enter the open slots in the ears $J^{\times\times}$, said ears being connected with the frame of the machine and said slots extending in inclined direction, so that the chute may be raised and said studs emerge from the slots of the ears. When said studs are in position, the chute J and connecting parts are properly sustained.

The cross-bar G is provided with the bosses G', which are guided and adapted to slide on the rods 19, said bar having projecting forwardly from it at L the plunger M, which is located horizontally under the discharge end of the chute K and movable on or over the table N on the frame A.

Mounted on an arm of the frame below the rod 7 is the reel 20, on which is wound the tinfoil or other suitable wrapping material, the unwound portion of which passes over the table N, beneath the plunger M, and consequently beneath the article delivered from the chute K.

In front of the plunger M is the knife or cutter P, which is connected with the cross-bar $21^{\times\times}$ of the frame of the machine. Attached to the ends of said bar are the swinging arms $22^\times$, which are mounted on the frame of the machine, as at $23^\times$.

In the bed-plate of the machine is an opening $24^\times$ for the passage of the knife P in its descending and ascending motions. The knife is adapted to be raised or lowered by means of the pitman 23, which is attached by the line 24 to the vertically-guided rod 25, the latter carrying the arm $25^\times$, which is engaged by the cam 26, (see Figs. 2 and $2^{\times\times}$,) the cam 26 being mounted on the shaft 27, on which is keyed or otherwise secured the worm-wheel 28, which meshes with the worm 29, which is secured to the shaft 32 of the gear-wheel 2, so as to be operated by the same, by which provision the cutter P may be lowered and raised. Below the knife or cutter P is the bed-knife P', Fig. 1$^{\times\times}$, which is connected with the swinging arm R', whose axis S' is pivotally mounted on the table or portion N' of the machine, said knife being pressed forward in the direction toward the path of the cutter P by the action of the spring Q', which bears against said arm and is connected with the frame A, the forward motion of said knife being limited by the studs T' on the frame A.

The feed-rolls 36 are separated from each other, forming spaces between the ends of the same for the passage of the cakes therethrough.

The upper face of the bed-knife serves to support the foil or covering material above the same and moves slightly rearward after the cutter P has severed said material, due to contact of the side of the cutter with the contiguous edge of the bed-knife. (See Fig. 1$^{\times\times}$.) When the cutter ascends, the bed-knife returns to its normal position, and this movement, slight as it may be, prevents the material from sticking on said bed-knife, the knife making a sharp cut.

Q designates a die which is located above the table N in front of the cutter P and connected with the rising and falling rods 30, which are guided in the frame A and provided with an arm 31, which is engaged by the cam 31$^\times$ on the shaft 27.

On the shaft 32 of the gear-wheel 2 is a mutilated pinion 33, which meshes with the gear-wheel 34, gearing with which is the feed-roller 35, above which are the feed-rollers 36, said feed-rollers being located rearward of the cutter P and having the foil or wrapping material passed between and fed intermittently by the same in the direction toward the cutter P, the shafts of the upper feed-rollers being carried by the swinging arms 21, which are pivoted at 22 to a cross-bar 21$^\times$ of the frame, whereby said rollers may be raised, and when lowered they press down on the foil, passing between the same and the lower rollers, the raising of the upper rollers permitting of the application or insertion of the foil between the said upper and lower rollers.

The table in front of the cutter P is sunken, as at N', as will be most apparent in Figs. 2, 3, 14$^{\times\times\times}$, and 16, at the sides of which, below the die Q, are the grippers R, which are primarily adapted to support the piece of the covering material and the article to be covered placed therein, as shown in said Fig. 16.

The grippers R consist of the parallel bars R', which are pivotally connected by the links 37 with the part 38 of the block S, which latter is horizontally guided on the longitudinally-extending part A$^3$ of the frame A, (see Fig. 3,) and in front of the die Q are located the folders T, which consist of concave plates bent or twisted and flaring and having their inner walls converging in the direction from the die Q, one of the inner converging walls of the folders being set out above that of the other plate and overhanging, so that the folding down of one side of the wrapping or covering material may be accomplished in advance of the other side thereof, as will be apparent on reference to Figs. 1, 1$^\times$, 13, and 14.

S' designates a slide mounted on the end of the part A$^3$ of the frame A and having on its under side the rack 39 and on the sides of its ends the racks 40 and 41, it being noticed that said ends are of different widths, the racks 40 being on the narrow end.

Interposed between the lower end of the block S and the top of the part A$^3$ of the frame A is a plate A$^4$, which is pressed against said top by the springs A$^5$, thus producing increased friction for the block on said top in its movement thereon. (See Figs. 5 and 13$^\times$.)

U designates the corner-folders, consisting of a series of flat-sided heads which are secured to the vertical shafts 42, the latter being mounted on the block S, said shafts having secured to them the pinions 43.

The axis or shafts 38$^\times$ of the links 37 have connected with them the segmental racks 44, (see Figs. 4 and 5,) the same engaging with the racks 40, whereby said links may be operated in order to open and close the gripper-bars, it being noticed that the slide S' has its rack 39 engaged with the segmental rack C, heretofore described, so that motions are imparted to the slide S' in opposite directions, and consequently similarly to the segmental racks 44, and links 37, and the gripper-bars R', it being noticed that as the slide S' advances the racks 40 cause the closing of the grippers and the racks 41 cause the closing of the corner-folders U, the block S meanwhile remaining at rest; but as soon as the grippers have been fully closed and held against the cake the advance motion of the slide is imparted to the block S, and the latter then advances and carries the cake as gripped to the full extent of the stroke of said slide, while the cake which has its foil or covering material folded by the corner-folders U precedes the gripped cake while resting on the table N'.

The racks 41 of the slide S' mesh with the pinions 45, carried by the vertical shafts 45$^\times$, and the latter having secured to them the gear-wheels 46$^{\times\times}$, which mesh with the idlers 43$^\times$, which in turn mesh with the pinions 43, next to the segmental racks 44, and impart motion to the pinions 43, and consequently to the corner-folders U, carried by the shafts of said pinions. The gear-wheels 46$^{\times\times}$ also mesh with the pinions 43, that are farthermost from the segmental racks 44, so as to impart motion to the corner-folders U. It will be noticed that by this arrangement of gearing said corner-folders will be caused to rotate in reversed direction, as indicated by the arrows in Fig. 6.

In the block S is a longitudinally-extending slot 46 for purposes to be hereinafter explained. Interposed between the side of the portion A³ of the frame and the inner wall of the slide S', which travels on said portion A³, is the gib 46× for taking up the lost motion of said parts due to the wearing away of the same, these several parts being most clearly shown in Figs. 4, 5, 6, 7, 8, and 9.

V designates folders located over the space between the heads U and firmly secured to the shafts V×, to which latter are also firmly secured the vertical rods 48, which are pivotally connected with the cross-head 50, from which depends the vertical rod 51, which is guided in the frame A, and has rigidly secured to it the arm 52, with which engages the cam 53 on the shaft 27, whereby the shafts V× may be raised and lowered.

The shafts V× are loosely fitted in the outer ends of arms 47, and the inner ends of said arms 47 are pivotally connected, as at 47×, to ears 49 on the frame A. By these means the folders V when raised and lowered, as hereinbefore described, will always be in an approximately vertical position, thereby producing better results in the folding operation.

The lower ends of the folders V are provided with lugs V××, on which rest the lugs V⁴, which form part of the presser-foot V', so that said presser-foot is supported by the folders V and raise and lower with said folders.

The ear 49 is formed with a socket, in which is placed a spring V², which bears against the recessed foot V', so as to cause the same to press against the top fold of the foil or covering material and thereby retains the same in proper position, when the folders V are lowered to form the end folds A××. (Seen in Figs. 19, 20, and 21.)

When the presser-foot V' is lowered and comes in contact with the foil or folding material inclosing the article to be wrapped, its farther descent is prevented by said article; but the folders V continue to descend in order to produce the folds A××, (seen in Figs. 19, 20, and 21,) it being evident that the lugs V×× on the folders V leave or move from the lugs V⁴ on the presser-foot V' when the same ceases to descend. (See Figs. 3, 3×××, and 3××××.)

The folder on the side toward the die Q has at its lower end the upturned lip V³, whose object is to guide the edges of the foil or covering material beneath said folders should said edges curb, buckle, or be otherwise irregular.

W designates a printing or type head which is rigidly connected with one of the levers 54, which are mounted on the ears 55, the latter rising from the frame A, the other lever being pivotally connected with the vertical rod 55×, whose lower end is attached to the cross-head 56, attached to the rod 57, guided vertically on the frame A and provided with an arm 58, with which engages the cam 59 on the shaft 27, by which means the head W may be raised and lowered, as shown, respectively, in Figs. 2, 12, and 11, it also being noticed that a vertical passage X exists in the frame A below the head W, as shown in Figs. 2, 11, and 12, one side of said passage forming a vertical wall 60 and the opposite side having the spring 61 secured thereto.

When the article to be covered reaches the passage X, it is temporarily suspended by the unfolded end folds of the covering material resting on the wall 60 and spring 61, as shown in Fig. 13, said passage afterward receiving the fully-covered articles, as shown in Fig. 11, the base of said passage having thereat the sunken table 62. Supported on the standard 62×, rising from the frame adjacent to the head W, is the pivoted inking-pad 63, which is provided with a shoulder 64, which is so disposed as to be engaged by the inking head or die W, and thus raise the pad against the latter and apply ink or color thereto.

The table N' extends from the knife P to the passage X, the article to be wrapped, together with the wrapping material, being carried from said knife to said passage on the table N', as will be hereinafter again referred to.

It will here be observed that certain parts of the machine are duplicated—notably the feed, stamping, folding, conveying, and printing devices. The bed-knife is also duplicated, and the knife or cutter P is also duplicated, so as to adapt the machine for double work, or, in other words, in the present machine two rows of articles may be wrapped, as will be seen in Fig. 1, after which the wrapped material or article is directed to the chute 65, (shown in Figs. 22 and 23,) the same being properly mounted on the portion A² of the frame A, below which are mounted the endless aprons 66, which travel around the pulleys 67, which are also mounted on proper portions of said frame A², the shaft 69 of said pulleys receiving power by means of the belt 68, which is run from a proper part of the machine around the pulley 67×, which is held on said shaft by friction, so as to rotate with the same, but is adapted to slip, when required, for purposes to be hereinafter explained, said shaft 69 having secured to it the ratchet 70, whose teeth are adapted to be engaged by the tooth or detent 71 on the swinging arm 72, the latter being pivotally connected with the vertical rod 73, which depends from the arm 74, which is mounted on the standard A³ of the portion A² of the frame A, and has its upper end adapted to be engaged by the finger 75, which receives rotary motion from one of the shafts of the gearing 76, to which motion is imparted by the shaft 27. (See Figs. 2 and 23.)

The gear-wheel 76 is mounted on the shaft 76×, and with the same meshes a pinion 76×× on the shaft 27, whereby said wheel 76 receives motion. The shaft 76× imparts motion to the mutilated gear-wheel 76×××, with which latter gears the mutilated pinion 83× for imparting dwells to the chute Y while they discharge their contents into the boxes on the conveyer, it being noticed that the pinion 83× has untoothed portions at opposite places and the gear-wheel 76××× is untoothed for about three-quarters of its periphery. Consequently as the wheel 76××× revolves it imparts a half-rotation to the pinion 83×. Then there is a dwell on the latter and again another half-rotation of the same, after which there is another dwell. These motions are communicated to the shaft 83, so that the chute Y is moved to the right and left and caused to dwell at the end of each stroke.

Y designates an oscillating spout which is mounted on the chute 65 at the lower end thereof and has connected with it the rod 78, which by means of the pitman 79 and a wrist-pin on the crank-wheel 80 receives motion in opposite directions, the shaft of said wheel 80 being mounted on the frame A and having connected with it the beveled pinion 81, which by means of the bevel-pinion 82 and shaft 83 receives intermittent motion from the gearing 76 by means of the mutilated pinion 83× on said shaft 83. (See Figs. 22 and 23.)

It will here be observed that the rod 78 is connected with another spout Y', similar to the one previously described, and there is a duplication of the chute 65, whereby two rows of material or articles directed from the table 62 of the other part of the machine (shown in Figs. 1 and 2) may be directed to the right and left over the endless aprons 66, which latter are duplicates of each other and adapted to support and feed along the boxes Z, which are to be filled by the articles or materials from the spouts Y Y'.

The endless aprons 66 have thereon the shoulders 84, against which the boxes are rested during the filling operation, it being noticed that said boxes have transverse partitions 85 therein, dividing the boxes into different compartments. The teeth of the ratchet 70 are of different lengths at 86, 87, and 87×, whereby variable motion may be imparted to said ratchet and to the endless aprons 66, and consequently to the boxes thereon, so that during the feeding of said boxes to the chute Y provision is made for imparting the proper motion to said boxes. After one box has been filled the next box which is empty is in position to be filled, in which case two end pieces of boxes are in contact. Provision is also made for advancing the box sufficiently as required by the thickness of the partition 85, so that the article or material directed into the boxes from the chutes Y will not strike either of the end pieces of the boxes or the partitions therein.

The teeth 87× of the ratchet 70 are of uniform size, the tooth 87 is longer and the tooth 86 still longer, so as to impart motions of different lengths to the apron 66, it being noticed that when the arm 72 is lowered the tooth or detent 71 engages with said teeth of the ratchet 70, thus locking the latter, while the pulley 67× runs continuously and slips on its shaft. When said arm rises, then the ratchet receives motion the distance of one tooth and the box is advanced the distance of one cake or piece of material, after which said arm drops and the ratchet 70 is again locked and the feed of the box ceases.

The motion of the arm 72 is accomplished by the rotary finger 75, the arm 74, and connecting-rod 73, said finger receiving motion from the shaft 76×, as has been stated.

Referring to Figs. 25 and 28, K and A' designate the feed-chute and arm above the same, as in Fig. 2. At the side of the chute K is a plate 88, which is connected with the swinging arm 89, whose axis is on the portion of the frame A adjacent to said chute, so that said plate bears against the sides of the articles, material, or cakes 13. On the axial end of the arm 89 is a toothed segment or quadrant 90, which meshes with the rack 91 on the sliding rod or bar 92, the latter being fitted in the guide 93 on the frame A. Pivotally connected with one end of said rod 92 is a link 94, to which is also pivoted the sliding rod or bar 95, on which is the rack 96, with which meshes the toothed segment or quadrant 97, the latter being movably mounted on the rock-shaft 98, to which latter is secured the shoe 99, one limb 100 of which is adapted to enter the slot 101, the shaft 98 being mounted in the sleeve 102, which latter is secured to the side of the bed $S^2$ on which the tin-foil or other covering material is supported as it is fed to the machine. The segment 97 is movably secured to the shaft 98 by the pin 103, which passes through the slot 104 in said segment and is connected with said shaft.

105 designates the shipper shaft or bar, (see Figs. 25, 28, and 1,) the same having thereon the rack 106, with which meshes the pinion 107, whose shaft is mounted in the sleeve 108 and carries the pinion 109, with which meshes the rack 110 on the sliding rod 111, the latter being freely fitted in the sleeve 112 and carrying the lug 113, which is adapted to engage with the lug 114 on the link 94. The sleeves 108 and 112 are secured to the part $S^3$ of the frame A, and the shafts 95 and 105 pass freely through said part and also through the support 115 of the bed $S^2$, it being noticed that said support is cut away, as at 116, for the feed-rollers 35 and 36 of the tinfoil or wrapping material.

Bearing against the arm 89 is the spring 117, whose tendency is to force the plate 88 into the chute K, restrained by the cake or pieces of material thereon.

Bearing against the rack 96 of the shaft 95 and the part $S^3$ of the frame is the spring 118 for a purpose to be hereinafter explained.

Connected with the rod 111 and a proper part of the frame is the spring 119 for imparting motion to said rod, in the present case to the left, said motion being communicated by the rack 110 to the pinions 109 and 107, and consequently to the shipper-bar 105.

In order to conveniently reset the parts, I provide the bar 105 with the knob or handle 120, said bar being also adapted to have the pin 121 inserted in it and bear against the sleeve 112 for controlling the stopping mechanism, so that the latter is rendered inoperative, especially when it is not desired to run both sides of the machine.

When the stopping mechanism is set, as shown more particularly in Figs. 25 and 28, the chute K is properly supplied with cakes or articles and the bed S² has the foil or wrapping material passed thereover, the shoe 100 resting against said foil or material and the plate 88 bearing against the sides of said cakes or articles, as has been stated.

Should the chute be empty, the plate 88 is unsupported and immediately enters the chute, the arm 89 swinging inwardly with said plate and the segment moving the rod or bar 92, whereby the link 94 is pushed outwardly, causing the disengagement of the lug 114 from the lug 113, whereupon the bar or rod 111 is moved by the spring 119. This rotates the pinions 109 and 107 and causes the shipper rod or bar 105 to be moved, so that the driving-belt is shifted from the fast to the loose pulley, which pulleys are shown in Fig. 1, the machine thus being stopped.

The shoe 100 rests upon the foil or covering material, as shown in Figs. 30 and 31. Should, however, the supply of said material cease, the shoe is no longer supported and so it drops into the slot 101. This rotates the shaft 98 and the quadrant 97, whereby the rack 96 receives motion and with it the rod 95. This moves out the lower end of the link 94, and thus disengages the lugs 113 and 114, whereby the rod or bar 111 is moved by the spring 119, so that owing to the pinions 109 and 107 the shipper rod or bar 105 is operated, thus shifting the driving-belt from the fast to the loose pulley and stopping the machine.

It will here be noticed that when the shoe 100 drops into the slot 101 the shaft 98 is rocked and the pin 103 bears against the wall of the slot 104 and so turns the segment or quadrant 97, in the present case to the left, thus shifting the bar or rod 95 in the same direction and compressing the spring 118. When the shoe is raised, the shaft is rocked in contrary direction, thus returning the pin 103 to its normal position, the left end of the slot 104 being adjacent to said pin. The spring 118 now expands and presses against the rack 96, moving the same to the right, and consequently returning the quadrant to its normal position, as shown in Fig. 28, Sheet 12.

Referring to Figs. 3 and 13×, it will be seen that the stationary table N' is T-shaped. In Figs. 4 and 14× said table N' has been removed, and there is shown in the block S the slot 46, which receives the vertical limb of said table, thus assisting to guide said block S in its longitudinal motions.

When the chute is properly supplied with cakes or articles and the foil or covering material passed between the feed-rollers, the operation is as follows, power having been applied to the driving-shaft B.

The cake or article 13 drops from the chute J upon the foil, which latter rests on the table N, as shown in Figs. 1× and 1××. The plunger M then advances the cake and the feed-rollers advance the foil on which the cake rests, said cake traveling slightly faster than the foil. The foil and cake then pass over the gripper-bars R', the foil being suspended thereon. (See Fig. 16.) The knife now descends and cuts off a piece of foil sufficient for the wrapper of said cake, said knife then ascending. The die Q now descends, whereby a trade-mark or other brand or characteristic is impressed on the cake, and the cake is lowered upon the sunken table N' by said die Q, simultaneously with which the sides of the foil are thrown up, as shown in Fig. 17, and the gripper-bars R' are closed against the portion of the sides of the foil which contact with the sides of the cake, said bars receiving motion by the operation of the links 37 due to the slide S' and the intermediate parts. The die Q rises and the slide then advances, owing to the rack 39 thereon and the engaging segmental rack C, the cake and foil then being carried forward by the grippers through the folders T, whereby the upper parts of the vertically-standing sides of the foil are successively folded down on the cake, as will be seen in Fig. 18. The block, with the grippers and folders U, now returns to its first position, the grippers separating while leaving the partly-wrapped cake on the table N'. Meanwhile the foil and another cake are advanced and the foil is cut and placed with said cake on the gripper-bars R' and the die Q lowered. The gripper-bars now close and the slide again advances, when the first-named cake is gripped by said bars at the forward ends thereof and carried beneath the folders V, when the latter descend and turn down the upper front and rear portions of the foil and fold the same against the corresponding portion of the cake, the result being shown in Fig. 19, after which said folders ascend. The slide again returns while the gripper-bars separate, thus leaving the cake as partly wrapped, as in said Fig. 19, on the table, but between the folders U, whose flat faces are in a right line with the inner sides of the gripper-bars, as shown in Fig. 14××. Meanwhile the second cake has been carried through the folders T and a third cake has been started on its wrapping operations. The slide then advances, when, owing to the gearing 43, the folders U make a quarter-turn and bring their flat faces against the sides of the front and rear ends of the foil and turn in the same, so as to fold them against the corresponding ends of the cake, (see Figs. 7 and 14×,) the result being shown in Fig. 20. The cake is now carried by the folders U beneath the printing-head W and above the passage X, when the folders assume their first position, as in Fig. 14××, and the block S returns, leaving the cake suspended on the spring 61 and wall of the passage X by the lower projecting ends of the foil as existing in Fig. 20. (See Fig. 12.) The printing-head W is not lowered, when it will be seen that a label previously pasted or otherwise affixed to the roll of foil is in position to receive an impression from said head, which being accomplished the cake is now caused to descend in the passage X, in which motion the lower end portions of the foil are thrown up, as will be seen in Fig. 21. (See also Figs. 11 and $14^{\times\times\times}$.)

As the subsequent cakes are wrapped and descend in the passage X the lowermost cake is pushed down by the cakes above the same, restrained by the pressure of the spring 61. When the lowermost cake clears said spring and the wall of the passage X, it drops on the table 62, when it is engaged by the forward end of the block S (see Fig. $14^{\times\times\times}$) and forced toward the chute 65, it being noticed in said figure that spaces exist below the spring 61 and the wall of the passage X to permit the movement of the lowermost cake toward the chute 65. The cakes are advanced to said chute by the following cakes being subjected to the pushing action of the block S, and so they are moved down to said chute, the foremost cake being slightly restrained by the springs 122, secured to the inner sides of said chute at the lower end thereof. As the chute oscillates intermittently the cakes are laid side by side on the bottom of the box and then another row placed side by side thereon. The box now advances the distance of an ordinary tooth $87^{\times}$ of the ratchet 67, so that other cakes may be placed on the bottom of the box and another row thereupon, and so the packing continues until the partition 85 is reached, when, owing to the longer tooth 87, the box is advanced the distance of said partition, when the packing continues. Then when the first box is full the long tooth 86 causes the boxes to move the distance of the end pieces of the two boxes which are in contact and of the distance of the thickness of a cake, when the second box may be packed, it being here noticed that the apron 66 is placed obliquely or at an inclination, so that the boxes assume a similar position and thus the cakes are set into the boxes regularly and compactly. When a box is full and reaches the bottom of the apron 66, it is removed therefrom in any suitable manner, it having been supported thereon by the battens or shoulders 84, as has been stated, and so prevented from slipping.

The work of wrapping, printing, and boxing is duplicated owing to the duplication of the parts, as has been stated.

When the feed-chute K is in operative position, the weight of the same and that of the parts carried thereby causes the feed-roller H' to rest firmly on the apron J, whereby the latter contacts with the feed-roller H, whereby slipping of said apron is prevented and its advance or feeding motion is effectively accomplished. When the chute is raised on the journals of the lower guide-roller 12, the feed-roller H' rises above the roller H without disturbing the apron J, and said chute, with its appurtenances, may be entirely removed from the frame A' for the purpose of cleansing and repairs.

Having thus described my invention, what I claim as new, and desire to secure by Letters Patent, is—

1. A feed-chute carrying an endless apron, and guide-rollers therefor, said chute being axially supported at one end whereby it may be raised with said apron and rollers and displaced.

2. A feed-chute having mounted above the same, an arm carrying an endless apron, and guide-rollers therefor, said apron being adapted to bear upon the articles fed on said chute said chute and arm being adapted to be simultaneously raised, and the arm to be raised independently of said chute.

3. A feed-chute and an endless apron thereon for conveying the articles, in combination with an arm which is mounted on said chute, an endless apron on said arm adapted to press against said articles, and a crank which is pivotally connected with said arm, a spring attached to said arm and crank for throwing out the latter, and a roller on said crank bearing outwardly on said pressure-apron.

4. An arm mounted on a feed-chute and provided with an endless apron adapted to press upon the articles on said chute, said arm being adapted to be raised independently of said chute, and said chute to be raised simultaneously with said arm.

5. A cross-bar, means for moving the same in opposite directions, a swinging arm connected with said bar, a pawl on said arm, and a ratchet and feed-roller mounted on the frame of the machine, in combination with a chute having a feed-roller and an endless apron which passes between said feed-roller and the feed-roller on the frame of the machine.

6. In a wrapping-machine, a rising-and-falling cutter, a table with an opening for the passage of said knife, and a bed-knife below said table adjacent to said opening, said bed-knife being connected with a swinging arm which is mounted on the same, and having an advancing-spring bearing against it.

7. In a wrapping-machine, a floor, a feed-chute leading to said floor, an arm on said chute, endless aprons on said chute and arm, a tension device on the arm for the endless apron thereof, a plunger for advancing on said floor the article to be wrapped, and feed-rollers for advancing the wrapping material, in combination with a stamp or die, means for raising and lowering the latter, bars on which said article and material may be temporarily supported, and a sunken floor below said bars adapted to receive the partially-wrapped article.

8. The grippers R consisting of the parallel bars R', pivotal links connected therewith, a block carrying said links, toothed segments on the shafts of said links, and a slide with racks engaging said segments.

9. The folders T consisting of concave and converging plates, one of the walls thereof overhanging the corresponding wall of the other plate, in combination with a table below said folders, the movable grippers R between said folders and table in the space aside of the article to be wrapped placed on said table, means for laterally moving said grippers, and means for advancing the same.

10. A block carrying a pair of grippers, corner-folders, and gearing for said grippers and folders, and a slide provided with racks for operating said gearing and moving said block in opposite directions.

11. A block carrying a pair of grippers, corner-folders, and gearing for said parts, and provided with the friction-plate $A^4$ and the spring $A^5$ bearing against the same, in combination with the part $A^3$ of the frame A, on which said plate $A^4$ moves.

12. The folders U mounted on the block S and consisting of flat-sided heads, gearing on the shafts of said heads for imparting rotary reciprocating motions thereto, and a slide carrying said block adapted to operate said gearing.

13. The folders V, the radial arms 47 on the shafts of the same, the rods 48 connected with said shafts, the ears 49 on which the axes of said arms are mounted, and means for operating said rods 48.

14. The ear 49, in combination with the folders V, the radial arms 47 mounted on said ear and having shafts at their outer ends from which said folders depend, means for raising said arms, the presser-foot $V'$ freely suspended from said folders, and a spring pressing downwardly on said foot.

15. The folders V, and means for raising and lowering the same, in combination with the upturned lip $V^3$ on the side of one of said folders.

16. A movable block, and a follower for operating the same, gripper-bars and corner-folders carried by said block, operating devices for said bars and folders likewise on said block, and a stationary table on which the articles are engaged by said bars and folders, in combination with a printing-head, means for operating said head, and the frame of the machine having a vertical passage therein below said head, and a sunken table at the base of said passage.

17. A swinging printing-head, and means for raising and lowering the same, in combination with a swinging inking-pad, and a standard therefor on the frame of the machine, said pad having near its axial end a shoulder against which said head strikes to raise the face of said pad against the face of said head, in combination with the frame having a vertical passage therein below said head, a table at the top of said passage, and a table at the base thereof.

18. The printing-head W, and means for operating the same, the frame having a vertical passage therein, the vertical wall 60 at one side of said passage, a spring in said passage opposite to said wall, one limb of said spring projecting upwardly and serving with said wall to support the ends of the covering material on which the material to be wrapped is rested while being printed.

19. The frame having a stationary table thereon, movable grippers and corner-folders, gearing for said grippers and folders, and a block carrying said grippers, folders and gearing, in combination with a slide which is provided with racks adapted to operate said gearing and move said block, and a toothed segment adapted to engage one of the racks of said slide for moving the latter in opposite directions.

20. Feed-chutes each having an oscillating discharge-spout, in combination with the coupling-rod 78 pivotally attached to the two spouts, the pitman 79 connected with said rod the crank-wheel 80 on whose wrist-pin said pitman is mounted, and means for imparting intermittent motion to said wheel.

21. A machine for wrapping articles, provided with a plate adapted to be controlled by the articles on the feed-chute of the machine, a shipper bar or rod, and mechanism intermediate of said plate and bar, said feed-chute having an opening in its side, the same being primarily occupied by said plate.

22. A stop-motion for an empty feed-chute consisting of a plate adapted to be controlled by the articles on said chute, a swinging arm carrying said plate, a bar with which said arm engages, a link connected with said bar, a sliding rack with which said link may interlock, and gearing engaging with said rack and a shipper rod or bar.

23. A stop-motion when the wrapping material fails, consisting of a shoe adapted to enter a slot in a bed in which said material is supported, a rock-shaft carrying said shoe, a toothed segment freely mounted on said shaft, a rack meshing with said segment, a link connected with the rod which carries said rack, a sliding rack with which said link may interlock, and gearing engaging said rack, and a shipper rod or bar.

24. In a stop-motion operative on the failure of wrapping or covering material, a shoe, a rock-shaft carrying the same, a toothed quadrant on said shaft, a rack-bar engaged by said quadrant, a rod carrying said rack, a spring bearing against the latter, and mechanism connected with said rod, and a shipper bar or rod, said quadrant having a slot in the end on the rock-shaft, and the latter having a pin which freely occupies said slot.

JAMES J. SULLIVAN.

Witnesses:
JOHN A. WIEDERSHEIM,
WM. C. WIEDERSHEIM.